United States Patent
Abboud et al.

(10) Patent No.: US 11,422,024 B2
(45) Date of Patent: Aug. 23, 2022

(54) METHOD FOR DETECTING A DEFECT IN A VIBRATION SENSOR, ASSOCIATED DEVICE AND COMPUTER PROGRAM

(71) Applicant: SAFRAN, Paris (FR)

(72) Inventors: Dany Abboud, Moissy-Cramayel (FR); Mohamed El Badaoui, Moissy-Cramayel (FR)

(73) Assignee: SAFRAN, Paris (FR)

( * ) Notice: Subject to any disclaimer, the term of this patent is extended or adjusted under 35 U.S.C. 154(b) by 137 days.

(21) Appl. No.: 16/603,644

(22) PCT Filed: Apr. 24, 2018

(86) PCT No.: PCT/FR2018/051015
§ 371 (c)(1),
(2) Date: Oct. 8, 2019

(87) PCT Pub. No.: WO2018/197797
PCT Pub. Date: Nov. 1, 2018

(65) Prior Publication Data
US 2020/0116554 A1    Apr. 16, 2020

(30) Foreign Application Priority Data
Apr. 26, 2017  (FR) .................... 17 53648

(51) Int. Cl.
*G01H 1/04* (2006.01)
*G01H 1/00* (2006.01)

(52) U.S. Cl.
CPC .................. *G01H 1/003* (2013.01)

(58) Field of Classification Search
CPC ....................................... G01H 1/003
See application file for complete search history.

(56) References Cited

U.S. PATENT DOCUMENTS

| | | | |
|---|---|---|---|
| 5,629,872 A * | 5/1997 | Gross | G05B 9/03 702/116 |
| 5,943,634 A | 8/1999 | Piety et al. | |
| 6,240,372 B1 * | 5/2001 | Gross | G01R 23/16 702/71 |
| 6,804,628 B2 * | 10/2004 | Gross | G01R 23/16 702/183 |

(Continued)

FOREIGN PATENT DOCUMENTS

WO    WO 97/43729 A1    11/1997

OTHER PUBLICATIONS

International Search Report dated Aug. 1, 2018 in PCT/FR2018/051015 filed on Apr. 24, 2018.

(Continued)

*Primary Examiner* — Mohamed Charioui
*Assistant Examiner* — Christine Y Liao
(74) *Attorney, Agent, or Firm* — Oblon, McClelland, Maier & Neustadt, L.L.P.

(57) ABSTRACT

A method detects a defect in a vibration sensor including the whitening of the vibratory signal delivered by the vibration sensor, and the calculation of an indicator of asymmetry of the whitened vibratory signal. The whitening may be a cepstral whitening implemented simply by dividing the Fourier transform of the signal by its modulus. The asymmetry indicator is a counter of aberrant points in the whitened vibratory signal.

8 Claims, 3 Drawing Sheets

(56) References Cited

U.S. PATENT DOCUMENTS

2014/0365411 A1* 12/2014 Beigi .................... G06N 20/00
706/12

OTHER PUBLICATIONS

French Preliminary Search Report dated Mar. 21, 2018 in French Application 1753648 filed on Apr. 26, 2017.
Girondin, V. et al., "Vibration-based fault detection of accelerometers in helicopters," Author manuscript published in "Fault Detection, Supervision and Safety of Technical Processes," Mexico, 2012, XP055084680 (Total 6 pages).
Borghesani, P. et al., "Application of cepstrum pre-whitening for the diagnosis of bearing faults under variable speed conditions," ELSEVIER, Mechanical Systemsand Signal Processing, vol. 36, 2013, pp. 370-384, XP055461483.
Barbini, L. et al., "Application of cepstrum prewhitening on non-stationary signals," in "Advances on Condition Monitoring of Machinery in Non-Stationary Operations," Sep. 12, 2016, Springer International Publishing, Cham, vol. 9, XP055461532 (Total 9 pages).

* cited by examiner

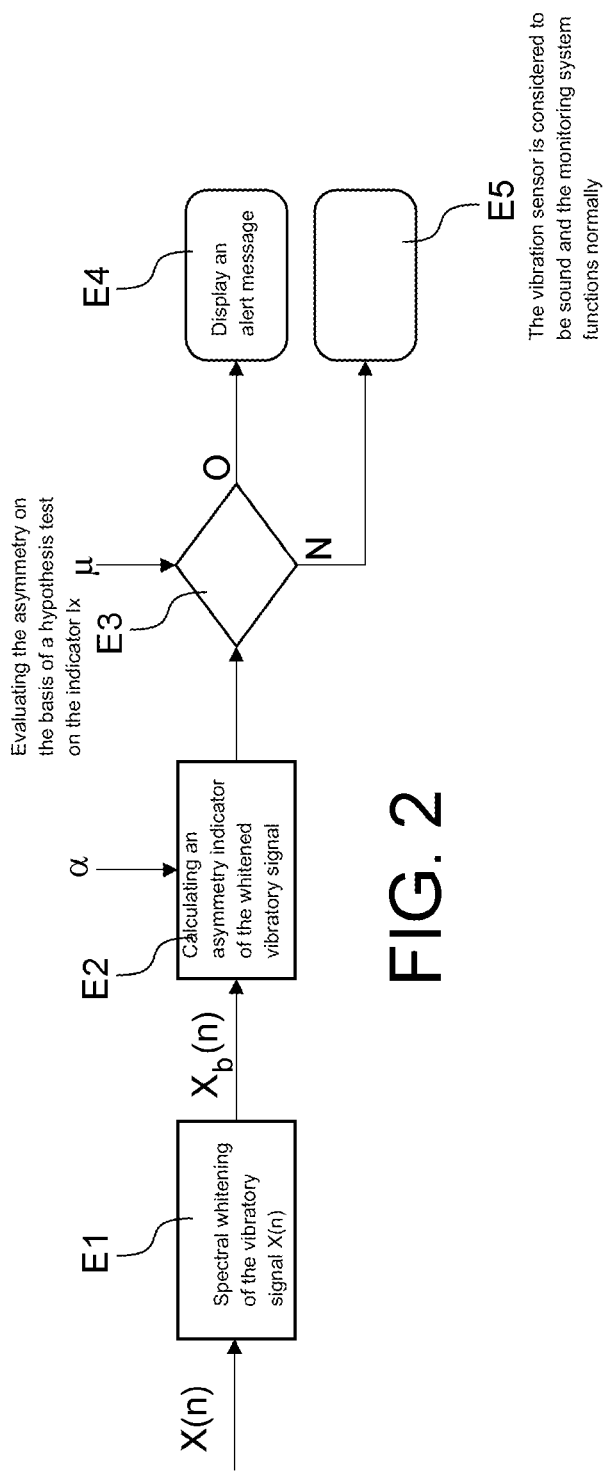
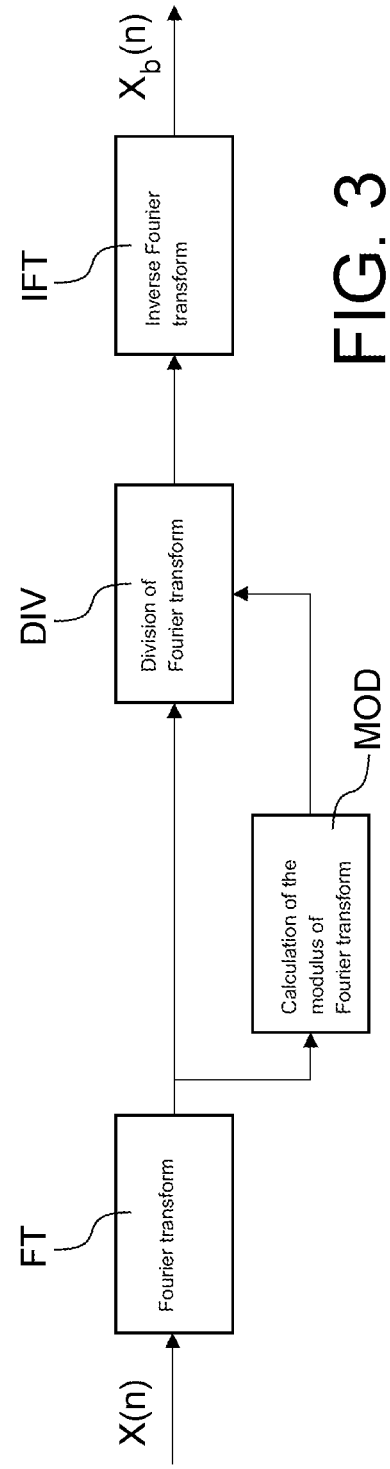

METHOD FOR DETECTING A DEFECT IN A VIBRATION SENSOR, ASSOCIATED DEVICE AND COMPUTER PROGRAM

TECHNICAL FIELD

The field of the invention is that of systems for monitoring the condition of a machine, such as an aircraft turbine engine, in particular for predictive maintenance purposes. The invention relates to monitoring of the machine by analysing vibrations thereof, and relates more particularly to the detection of a defect, in particular a fixing defect, in a vibration sensor used for carrying out such monitoring.

PRIOR ART

Rotary machines are used in a wide variety of applications, such as transport, civil engineering, in industrial production, energy, etc. These machines often function in hard environments and under severe operational conditions. Despite good reliability, these mechanical systems are naturally exposed to malfunctionings. Such malfunctions may not only significantly increase the operating cost of the system, but may also give rise to serious risks for the users.

One solution for optimising the functioning of a machine while ensuring safety is predictive maintenance. This is based on a monitoring system, the role of which is to produce commands for maintenance actions from an analysis of various types of input measured by sensors (temperature, pressure, vibrations, current, voltage, etc.). The efficacy of such an approach is therefore mainly based on the precision and reliability of the monitoring system.

In this context, vibratory analysis is a widely accepted technique for monitoring the condition of machines in a variety of mechanical applications. The efficacy of this approach results from the fact that the vibrations of machines contain a great deal of information on the internal forces in the system. These internal forces are often related to certain defect mechanisms and present distinctive vibration symptoms designated by the term mechanical signatures.

The vibrations can be measured with various types of sensor, namely movement, speed and acceleration sensors. Accelerometers are the most used at the present time since they make it possible to observe a wide range of frequencies, and are robust and available in a wide range of sizes and configurations.

The vibration sensor is fixed close to the elements to be monitored (for example on the bearing support of a gear set or of a bearing). It is followed by an acquisition chain, the role of which is to convert the analogue signal of the sensor into a digital signal. This digital signal, referred to as a "raw signal", comprises the component relating to the defect, in addition to other components relating to other sources. It is processed by mathematical signal methods (for example filtering, spectral analysis, statistical tools, optimisation, etc.) in order to identify the presence of vibratory signatures of abnormalities. Indicators are calculated from the signals processed in order to evaluate the progression of the abnormality and to quantify the severity thereof. The values of these indicators are compared with thresholds and, consequently, a decision is taken to trigger or not an alarm.

In the majority of applications, the vibration sensors are fixed by means of an adhesive (for example cyanoacrylate glue, dual-phase adhesive strip, petrowax, hot glue). The natural frequency of a vibration sensor depends on the rigidity of the fixing, and thus the choice of the adhesive is crucial for precise measurement. The following criteria are thus considered when choosing the adhesive: the mass of the vibration sensor, the frequency bandwidth necessary for the measurement, the expected amplitude and the temperature at the measuring point. In reality, even in complying with these criteria, vibration sensors are liable to undergo greater or lesser detachment because of the functioning in hard environments and under severe operational conditions (for example high temperature, speed and torque). Such detachment may significantly affect the transfer function of the sensor and the properties thereof. Consequently the structure of the signals measured may be significantly modified and false alarms may be triggered by the system for monitoring the condition of the machine.

In order to reduce the level of false alarms and thus to improve the reliability of the condition-monitoring systems, it is possible to seek to assess the exactitude of the measurements supplied by a vibration sensor by detecting any defect, such as a fixing defect.

A defect in the vibration sensor impairs the transfer function of the sensor by making it non-linear, which is manifested by high asymmetry in the vibration signal. It is thus possible, as reported in the article by V. Girondin et al. entitled "Vibration-based defect detection of accelerometers in helicopters", SAFEPROCESS—8th IFAC Symposium on Defect Detection, Supervision and Safety of Technical Processes, Aug. 2012, Mexico City, Mexico. pp. 720-725, 2012, to quantify the asymmetry of the vibration signal and to presume the existence of a defect when this asymmetry exceeds a threshold.

This article proposes using an improved version of a conventional indicator of asymmetry (the skewness) based on the optimisation of a linear filtering that maximises the value of the skewness of the filtered signal. This maximum value is then the indicator adopted for detecting a defect in the vibration sensor. Optimisation of the linear filtering is an iterative process greedy in computing time.

DISCLOSURE OF THE INVENTION

The objective of the invention is to improve the precision of the detection of a defect in the vibration sensor by quantifying the asymmetry of the vibration signal, and thereby to increase the reliability of a system for monitoring the condition of a machine by vibratory analysis.

To this end, the invention proposes a method for detecting a defect in a vibration sensor, typically an accelerometer, comprising the spectral whitening of a vibration signal delivered by the vibration sensor and the calculation of an asymmetry indicator for the whitened vibratory signal. The calculation of the asymmetry indicator comprises the calculation of a difference between a number of positive aberrant points and the number of negative aberrant points in the whitened vibratory signal. A point on the whitened vibratory signal is an aberrant point, positive or negative, when the absolute value thereof is higher than an aberration threshold.

Certain preferred but non-limitative aspects of this method are as follows:

the whitening of the vibratory signal is a cepstral whitening;

the cepstral whitening of the vibratory signal comprises a Fourier transform of the vibratory signal, the calculation of the modulus of said transform, the division of said transform by its modulus and an inverse Fourier transform of the result of said division;

the asymmetry indicator is expressed in accordance with $$\frac{|N^+ - N^-|}{N},$$

with $N^+$ the number of positive aberrant points, $N^-$ the number of negative aberrant points and N the total number of aberrant points $N=N^++N^-$;

a defect in the vibration sensor is detected when the asymmetry indicator exceeds an alarm threshold;

the vibration sensor is installed in a machine, and the vibratory signal is exploited by a system for monitoring the state of health of the machine by vibratory analysis when no defect in the vibration sensor is detected.

The invention extends to a data processing unit comprising means configured to implement this method, as well as to a system for monitoring the state of health of a machine by vibratory analysis, this system comprising a vibration sensor installed in the machine and a data processing unit according to the invention coupled to the vibration sensor. The invention also relates to a computer program product comprising code instructions for implementing this method when said program is executed on a computer.

BRIEF DESCRIPTION OF THE DRAWINGS

Other aspects, aims, advantages and features of the invention will emerge more clearly from a reading of the following detailed description of preferred embodiments thereof, given by way of non-limitative example, and made with reference to the accompanying drawings, on which:

FIG. 2 is a flow diagram illustrating the method for detecting a defect in a vibration sensor according to the invention;

FIG. 3 illustrates a possible implementation of the spectral whitening carried out in the context of the invention;

DETAILED DISCLOSURE OF PARTICULAR EMBODIMENTS

Figure 1:
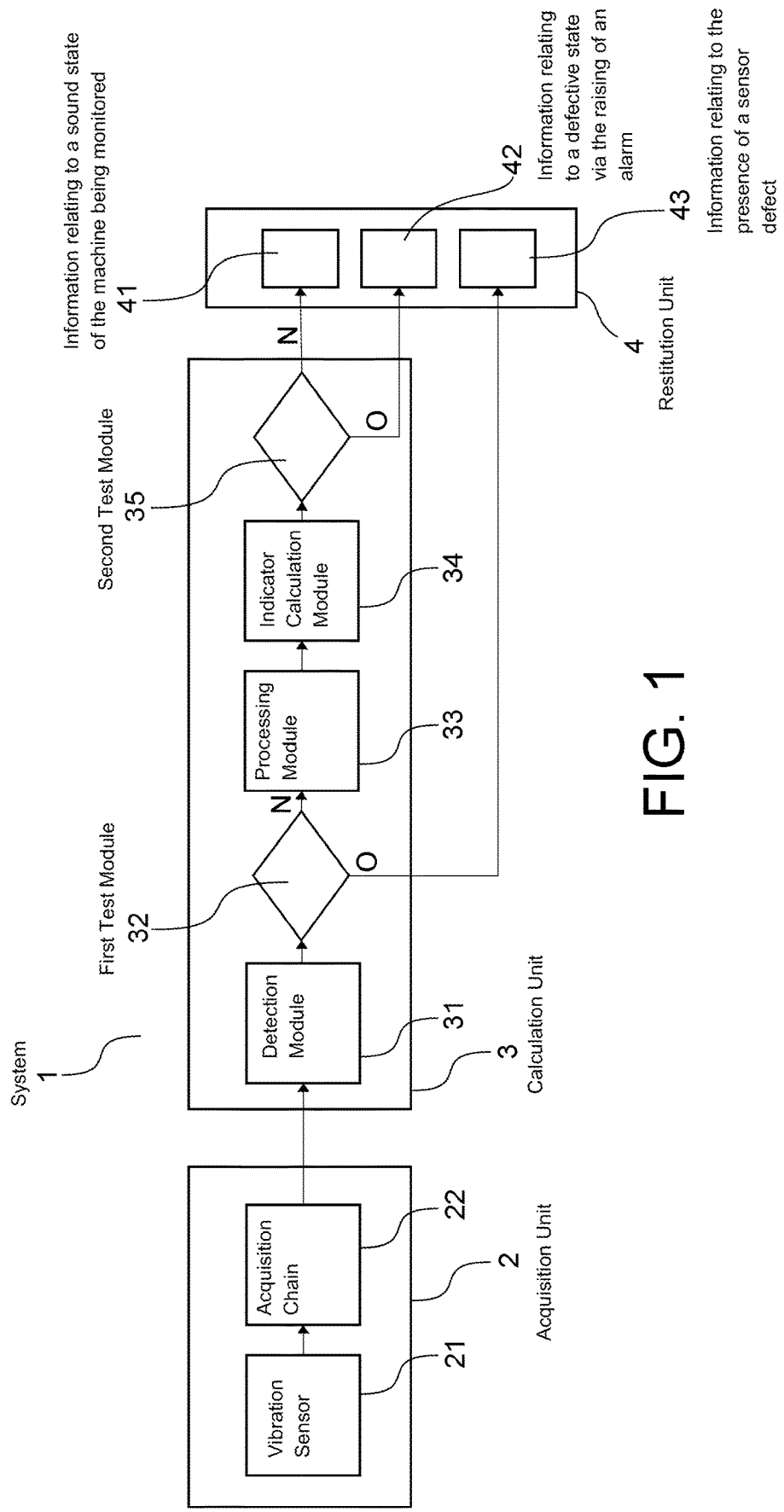
FIG. 1 is a diagram of a system for monitoring the state of health of a machine by vibratory analysis implementing the invention.

With reference to FIG. 1, the invention can be implemented in a system 1 for monitoring the state of health of a machine by vibratory analysis. The machine may be a rotary machine, a combustion or explosion engine, or a test bench. A favoured application is that of the monitoring of aeroplane or helicopter engines.

The system 1 comprises a unit 2 for acquiring the vibratory signal, a unit 3 for calculating state of health indicators and a restitution unit 4 for supplying an indication on the state of the machine and of the vibration sensor.

The acquisition unit 2 comprises a vibration sensor 21 fixed to the machine being monitored by means of adhesive, for example an accelerometer, and an acquisition chain 22 for the vibratory signal delivered by the vibration sensor 21. The role of the acquisition chain is to convert the analogue signal delivered by the vibration sensor 21 into a digital signal. The chain typically comprises the following elements: a conditioner (amplification, galvanic isolation and excitation of the passive sensors, etc.), an analogue filter (for limiting the bandwidth of the sensor and thus preventing deterioration of the signal-to-noise ratio and spectral aliasing), a sample and hold unit (which takes a sample of the signal and keeps it constant during the conversion phase) and an analogue-to-digital converter. The raw vibratory signal thus digitised is transferred to the calculation unit 3.

The calculation unit 3 is distinguished from a unit conventionally used in health monitoring in that it comprises a module 31 for detecting a defect in the vibration sensor configured to implement the method described hereinafter. The output of this sensor defect detection module is assessed by a first test module 32.

If no sensor defect is detected (output N of the first test module 32), the vibratory signal is the subject of digital processing in a processing module 33 and indicators are calculated from the signals processed in an indicator calculation module 34. The indicators calculated are assessed by a second test module 35, where they are compared with thresholds in order to take a decision whether or not to trigger an alarm (output N and O of the second test module 35), this decision being supplied by the restitution unit 4, typically a display able to present information relating to a sound state of the machine being monitored (block 41) or to a defective state via the raising of an alarm (block 42).

If a sensor defect is detected (output 0 of the first test module 32), the vibratory signal is not processed and the restitution unit 4 presents information relating to the presence of a sensor defect (block 43).

The method for detecting a potential defect in the vibration sensor implemented in the detection module 31 is described hereinafter.

The invention is based on the finding that the method disclosed in the aforementioned article associates any asymmetry in the vibratory signal with the presence of a defect in the vibration sensor. However, the applicant observes that the asymmetry of a vibratory signal is not solely related to a defect in the vibration sensor, but may also result from the non-linearity of the mechanical system and the distribution of the phases at the harmonics (sinusoids) because of the periodic vibrations generated for example by the gears. In a case of defect-free functioning of the vibration sensor, the vibratory signal therefore exhibits an asymmetry that risks being identified as excessive and therefore generating a false alarm.

In order to make it possible to distinguish the various sources of asymmetry, and with reference to FIG. 2, the method comprises a first step E1 of spectral whitening of the vibratory signal X(n). This step makes it possible in fact to reject the entire deterministic component of the vibratory signal and, consequently, the asymmetry that it causes. Under these circumstances, the asymmetry in the whitened vibratory signal $X_b(n)$ can be solely assimilated to the presence of a defect in the vibration sensor.

The deterministic part of the vibratory signal is periodic in stationary regime and therefore has a discrete frequency spectrum. The random part of the vibratory signal for its part has a continuous frequency spectrum. The spectral whitening of a signal consists of modifying the spectrum thereof so as to bring it close to the spectrum of a white noise. The whitened vibratory signal thus has a constant spectral power density where the peaks of the spectral envelope of the vibratory had been made uniform and the contribution of the deterministic part has consequently been erased.

The separation of the deterministic part of the random part of the vibratory signal can in particular be achieved by means of a cepstral whitening that keeps the sources present in the phase of the vibratory signal and eliminates all the sources that are manifested on the amplitude. This technique offers a remarkable ability for blind elimination of the deterministic content of a vibratory signal while whitening the spectrum thereof. This technique consists of zeroing all the complex cepstrum of the signal while keeping only the component relating to zero quefrency. The cepstrum is thus zeroed and next transformed in the time domain, after recombination with the phase of the original sign. A description of this cepstral whitening technique can be found in the article by P. Borghesani et al entitled "Application of cepstrum pre-whitening for the diagnosis of bearing faults under variable speed conditions", Mech. Syst. Sig. Process. 36 (2013) 370-384.

Advantageously, cepstral whitening can be carried out without calculating the cepstrum by simply using the Fourier transform of the vibratory signal. In such a case, and with reference to FIG. 3, the whitening of the vibratory signal X(n) comprises a Fourier transform FT of the vibratory signal, the calculation MOD of the modulus of said transform, the division DIV of said transform by its modulus and an inverse Fourier transform IFT of the result of said division. With DFT the discrete Fourier transform and $DFT^{-1}$ the inverse transform, the spectral whitening operation is written as $$X_b(n) = DFT^{-1}\left\{\frac{DFT\{X(n)\}}{|DFT\{X(n)\}|}\right\}.$$

With reference to FIG. 2, the method comprises a second step E2 of calculating an asymmetry indicator of the whitened vibratory signal. This calculation makes it possible to evaluate the non-linearity of the transfer function of the vibration sensor or, seen differently, the presence of a defect, such as a fixing defect, in the vibration sensor.

Figure 4:
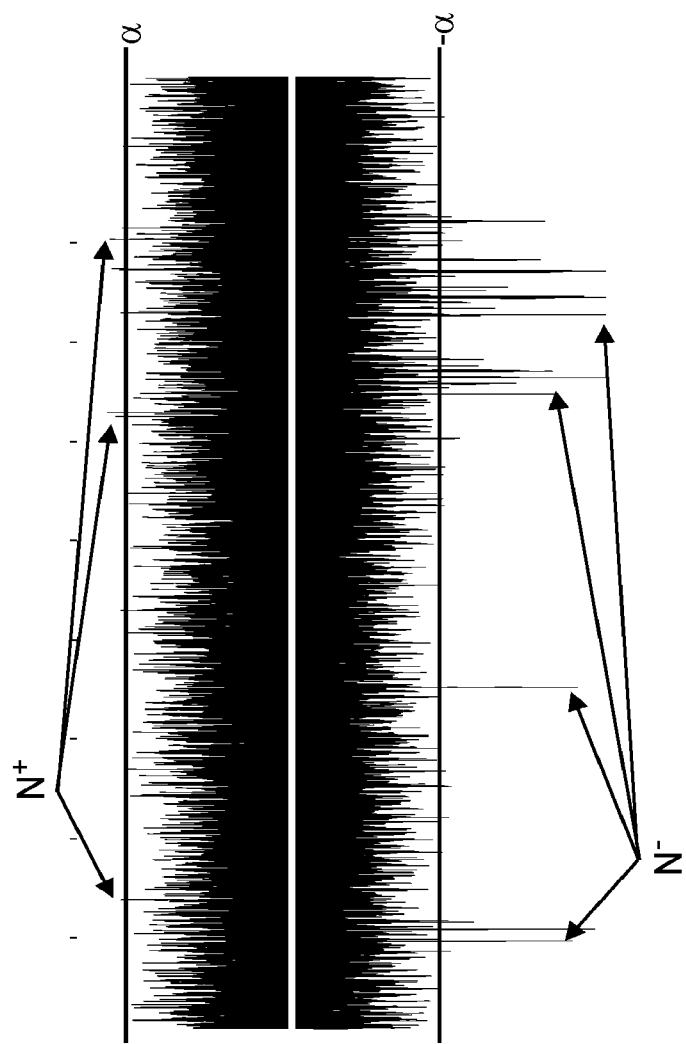
FIG. 4 illustrates a possible example of computation of an asymmetry indicator.

The asymmetry indicator is a counter of aberrant points in the whitened vibratory signal. More precisely, the aberrant-point counter quantifies the asymmetry from the difference between the positive and negative aberrant points, these aberrant points being defined with respect to a symmetry threshold referred to as the aberration threshold. The aberration threshold is designated $\alpha$, namely a positive integer smaller than the maximum value of the absolute value of the signal $X_b(n)$: $0<\alpha<\max(|X_b(n)|)$. An aberration threshold $\alpha$ is for example chosen equal to twice the standard deviation of the L samples considered of the whitened vibratory signal. The positive and negative aberrant points, designed $N^+$ and $N^-$ respectively, are defined as (cf. FIG. 4):

$$\begin{cases} N^+ = \sum_{n=1}^{L} I_{X_b(n)>\alpha} \\ N^- = \sum_{n=1}^{L} I_{X_b(n)<-\alpha} \end{cases}$$

where $I_{arg}$ designates the indicator function (it returns 1 when the condition $arg$ is true). Let us designate N the total number of positive and negative aberrant points ($N=N^+ + N^-$), the calculation of the indicator counting aberrant points comprises the calculation of the difference between the number of positive aberrant points and the number of negative aberrant points and can be defined as follows:

$$I_X = \frac{|N^+ - N^-|}{N}.$$

This indicator $I_x$ lies between 0 and 1 and is not influenced by the direction of the asymmetry. It returns 0 for a perfect symmetry and approaches 1 when the asymmetry is great.

This indicator $I_x$ proves to be more effective than the indicator based on the optimised skewness described in the aforementioned article. This is because, unlike the indicator $I_x$, optimised skewness is neither standardised nor bounded, and is therefore difficult to quantify. Furthermore, the asymmetry is characterised by directional pulses. However, these pulses do not affect the empirical probability distribution of the signal and are not detected by the skewness. The indicator $I_x$, for its part, is capable of detecting this particular type of asymmetry. Being more sensitive to asymmetry than skewness, the indicator of the invention makes it possible to improve the ability to detect defects in the vibration sensor. It is furthermore simple to calculate.

Once the asymmetry indicator is calculated, the method comprises a third step E3 of evaluating the asymmetry on the basis of a hypothesis test on the indicator $I_x$. This is because, even if the whitened vibratory signal is symmetrical, the indicator does not necessarily return an exactly zero value. This is due to the estimation errors (bias and variance of the indicator) resulting from the finite length of the signal. A threshold, referred to as the alarm threshold $\mu$, is adjusted, which defines the confidence level that it is wished to grant to the indicator. This threshold $\mu$ can be calculated from the empirical values of the indicator $I_x$ calculated on cases of sound operation of the sensor, or alternatively by statistical mathematical calculations. If the value of the indicator $I_x$ is below the alarm threshold $\mu$, the signal is considered to be symmetrical, otherwise it is considered to be asymmetric. Thus a defect in the vibration sensor is detected when the asymmetry indicator $I_x$ exceeds the alarm threshold $\mu$. In such a case (O in FIG. 2), an alert message can be displayed during a step E4 by the restitution unit 4. In the contrary case (N in FIG. 2), the vibration sensor is considered to be sound and the monitoring system functions normally during a step E5 in order to calculate indicators of abnormalities that will be compared with thresholds in order to decide on the presence or not of a defect in the machine.

It will be understood that the method according to the invention is quick, easy to implement, and does not require signals from other sensors. It also allows robust and precise detection of defects by means of the spectral whitening allowing the separation of sources of asymmetry related to the sound or defective functioning of the vibration sensor. Furthermore, no history is required for detecting the defect, the vibratory signal being evaluated independently of the measurements made before or afterwards. Finally, the indicator counting aberrant points is more sensitive to asymmetry than skewness and therefore improves the detectability of the sensor defects.

The invention is not limited to the method as described above, but also extends to a data processing unit comprising means configured to implement this method, as well as to a system for monitoring the condition of a machine by vibratory analysis that comprises a vibration sensor installed in the machine and such a data processing unit coupled to the vibration sensor. The invention also relates to a computer program product comprising code instructions for implementing the method when said program is executed on a computer.

The invention claimed is:
1. A method for detecting a defect in a vibration sensor, comprising:
performing a spectral whitening of a vibratory signal delivered by the vibration sensor; and calculating an asymmetry indicator in the spectrally whitened vibratory signal, wherein calculating the asymmetry indicator comprises calculating a number of positive aberrant points and a number of negative aberrant points in the spectrally whitened vibratory signal, a point in the spectrally whitened vibratory signal being a positive or negative aberrant point when the absolute value thereof is higher than an aberration threshold, and calculating a difference between the number of positive aberrant points and the number of negative aberrant points, and wherein the method further comprises a step in which a defect in the vibration sensor is detected when the asymmetry indicator exceeds an alarm threshold.

2. The method according to claim 1, wherein the spectral whitening of the vibratory signal is a cepstral whitening.

3. The method according to claim 2, wherein the cepstral whitening of the vibratory signal comprises a Fourier transform of the vibratory signal, a calculation of a modulus of said transform, a division of said transform by its modulus and an inverse Fourier transform of a result of said division.

4. The method according to claim 1, wherein the asymmetry indicator is expressed in accordance with $$\frac{|N^+ - N^-|}{N},$$

with $N^+$ the number of positive aberrant points, $N^-$ the number of negative aberrant points and $N$ the total number of aberrant points $N=N^+ + N^-$.

5. The method according to claim 1, wherein the vibration sensor is installed in a machine, and wherein the vibratory signal is exploited by a health monitoring system when no defect in the vibration sensor is detected.

6. A health monitoring system, comprising:
a vibration sensor installed in a machine and a data processing unit coupled to the vibration sensor, the data processing unit being configured to implement the method according to claim 1.

7. The health monitoring system according to claim 6, wherein the vibration sensor is an accelerometer.

8. A non-transitory computer
readable medium which stores thereon a computer program that when being executed by a computer, executes the method according to claim 1.

* * * * *